United States Patent [19]

Kiryu

[11] Patent Number: 4,909,098
[45] Date of Patent: Mar. 20, 1990

[54] HARMONIC DRIVE APPARATUS

[75] Inventor: Yuichi Kiryu, Hyogo, Japan

[73] Assignee: Mitsubishi Denki Kabushiki Kaisha, Tokyo, Japan

[21] Appl. No.: 684,584

[22] Filed: Dec. 21, 1984

[30] Foreign Application Priority Data

Dec. 29, 1983 [JP] Japan .................................. 58-250253

[51] Int. Cl.$^4$ .............................................. F16H 33/00
[52] U.S. Cl. ....................................... 74/640; 384/532
[58] Field of Search ................. 74/640, 804, 805, 797; 384/531, 532

[56] References Cited

U.S. PATENT DOCUMENTS

| | | | |
|---|---|---|---|
| 970,132 | 9/1910 | Sonnberg | 384/531 |
| 980,932 | 1/1911 | Eitner | 384/531 |
| 1,071,693 | 9/1913 | Bright | 384/532 |
| 1,155,185 | 9/1915 | Winkler | 384/532 |
| 1,168,937 | 1/1916 | Eitner | 384/532 |
| 1,242,502 | 10/1917 | Wingquist | 384/532 |
| 1,303,479 | 5/1919 | Hultgren | 384/532 |
| 1,329,089 | 1/1920 | Lindman | 384/532 |
| 2,932,986 | 4/1960 | Musser | 74/640 |
| 2,943,495 | 7/1960 | Musser | 74/640 |
| 3,091,979 | 6/1963 | Schaefer | 74/640 |
| 3,187,862 | 6/1965 | Musser | 74/640 |
| 3,202,019 | 8/1965 | Faxen | 74/640 |
| 3,214,999 | 11/1965 | Lapp | 74/640 |
| 3,239,699 | 3/1966 | Ferrary | 74/640 |
| 3,285,099 | 11/1966 | Parks, Jr. et al. | 74/640 |
| 3,469,463 | 9/1969 | Ishikawa | 74/640 |
| 3,492,887 | 3/1970 | Ellinger | 74/640 |
| 3,555,929 | 1/1971 | Hossfeld et al. | 74/640 |
| 3,667,320 | 6/1972 | Robinson | 74/640 |
| 4,003,272 | 1/1977 | Volkov et al. | 74/640 |
| 4,425,822 | 1/1984 | Marschner et al. | 74/640 |

FOREIGN PATENT DOCUMENTS

| | | | |
|---|---|---|---|
| 844853 | 6/1970 | Canada | 74/640 |
| 482936 | 9/1916 | France . | |
| 2138283 | 5/1971 | France . | |
| 1442248 | 7/1976 | United Kingdom . | |

Primary Examiner—Leslie A. Braun
Assistant Examiner—Christopher Campbell
Attorney, Agent, or Firm—Wenderoth, Lind & Ponack

[57] ABSTRACT

A harmonic drive apparatus comprises a circular spline which has internal spline teeth and which is rotatable around a rotational axis, a flexible cylindrical flexspline which is concentrically disposed within the circular spline and which has external spline teeth, the number of flexspline external teeth being less than the number of internal teeth of the circular spline, a wave generator disposed within the flexspline for flexing the flexspline in the radial direction thereof so as to locally engage the flexspline external teeth with the internal teeth of the circular spline, and a multi-row ball bearing flexible in the radial direction thereof which has balls equally spaced along the circumferential direction of the wave generator and which is disposed between the wave generator and the flexspline, the balls being disposed in a plurality of circumferential lines which are separated from one another along the axial direction of the wave generator, the balls in each circumferential line being disposed between the balls in the other circumferential lines with respect to the circumferential direction of the wave generator.

3 Claims, 3 Drawing Sheets

HARMONIC DRIVE APPARATUS

BACKGROUND OF THE INVENTION

The present invention relates to a harmonic drive apparatus and more particularly, to an improvement for a bearing member disposed between a flexspline and a wave generator disposed within the flexspline.

In a conventional harmonic drive apparatus such as disclosed in U.S. Pat. No. 3,285,099, a generally elliptical wave generator is rotated by its rotary shaft, and a flexible cylindrical flexspline is rotatably disposed outside the wave generator and has spline teeth around the outer circumference thereof. A circular spline secured to casings of the apparatus is disposed outside the flexspline and has spline teeth around the inner circumference thereof to locally engage with the outer teeth of the flexspline. The number of circular spline teeth is greater than the number of flexspline teeth. A bearing is disposed between the wave generator and the flexspline to rotate the flexspline. The bearing comprises inner and outer rings flexible in the radial direction thereof, and balls rotatably retained between the inner and outer rings. An output shaft is secured to the flexspline through a fastener such as a bolt to output the rotary force. The output shaft and the rotary shaft are rotatably connected through bearings to the respective casings secured to the circular spline.

In the above conventional harmonic drive apparatus, the wave generator is rotated by the rotation of the rotary shaft to successively move the engaging position in which the flexspline external teeth locally engage with the internal teeth of the circular spline. Since the number of circular spline teeth Nc is greater than the number of flexspline teeth Ns, the flexspline is slowly rotated in the direction opposite the rotational direction of the wave generator with a reduction gear ratio of $(Nc-Ns)/Nc$.

In this kind of the conventional apparatus, the bearing usually has a single circumferential race for the balls between the inner and outer rings. When the elliptical flexspline teeth locally engage with the circular spline teeth at the ends of the major axis of the flexspline, each of the two tooth engaging portions lies within some arc of $\theta°$ measured from the center of the flexspline. A stress is applied on the balls in the single circumferential line only when the balls are located in the vicinity of the tooth engaging positions. Namely, when the total number of balls is 23 and the arc angle $\theta$ of the tooth engaging portions measured from the center of the flexspline is 18°, the total number of balls stressed by tooth engagement is 2.3 from a calculation of $2\theta=36$ divided by the whole circumferential angle 360° and multiplied by the total number of balls 23, and is thus only 1.15 balls for each tooth engaging portion. Accordingly, only one or two balls actually contribute to the engaging of the flexspline and the circular spline. Furthermore, the flexspline locally engages with the circular spline at the highest engaging pressure in the proximity of contact positions in which said one or two balls contact with the outer ring of the bearing. These contact positions are moved in the rotational direction of the rotary shaft as the balls are moved so that a slight torque fluctuation is generated in the flexspline. This torque fluctuation causes a vibration of the harmonic drive apparatus which is significant during low speed operation of the apparatus. Further, since the highest engaging pressure of the flexspline and the circular spline occurs in the vicinity of said contact positions as stated above, a greater stress is applied on the flexspline of a relatively thin wall at such places so that the flexspline is excessively worn away at such places and thereby damaged in a relatively short time span.

SUMMARY OF THE INVENTION

Accordingly, an object of the present invention is to provide a harmonic drive apparatus in which the torque fluctuation of a flexspline is insignificant and the apparatus is thus not vibrated due to the fluctuation, and the stress on the flexspline is greatly reduced, thereby lengthening the life of the bearing.

With the above object in view, the present invention resides in a harmonic drive apparatus comprising a circular spline which has internal spline teeth and which is rotatable around a rotational axis, a flexible cylindrical flexspline concentrically disposed within the circular spline and having external spline teeth, the number of flexspline external teeth being less than the number of internal teeth of the circular spline, a wave generator disposed within the flexspline for flexing the flexspline in the radial direction thereof so as to locally engage the flexspline external teeth with the internal teeth of the circular spline, and a multi-row ball bearing flexible in the radial direction thereof which has balls equally spaced along the circumferential direction of the wave generator and which is disposed between the wave generator and the flexspline, the balls being disposed in a plurality of circumferential lines, the circumferential lines being separated from one another along the axial direction of the wave generator, the balls in each circumferential line being disposed between the balls in the other circumferential lines with respect to the circumferential direction of the wave generator.

DESCRIPTION OF THE PREFERRED EMBODIMENTS

Figure 1:
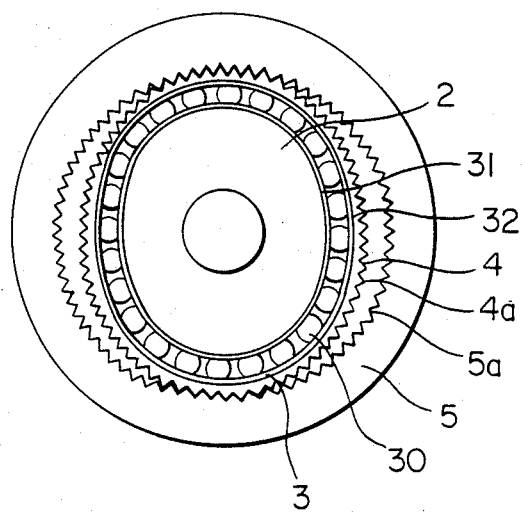
FIG. 1 is a front view of a harmonic drive apparatus according to the present invention.
Figure 2:
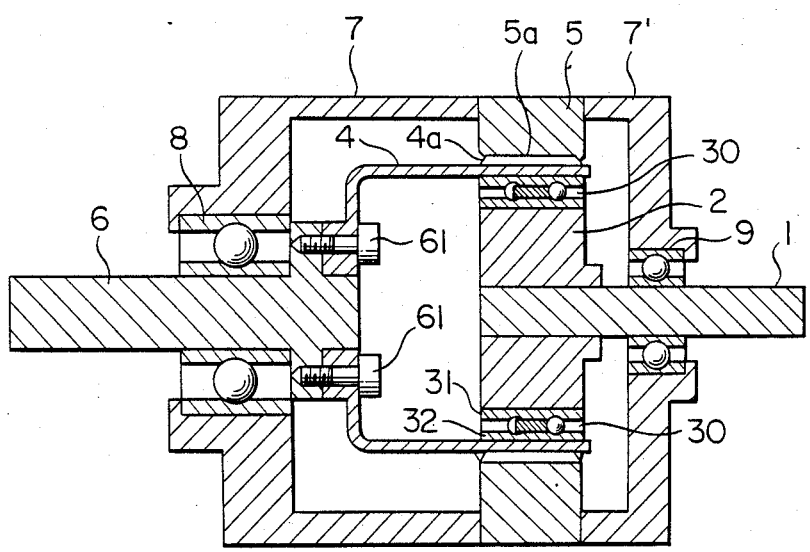
FIG. 2 is a sectional side view of the harmonic drive apparatus of FIG. 1.
Figure 5:
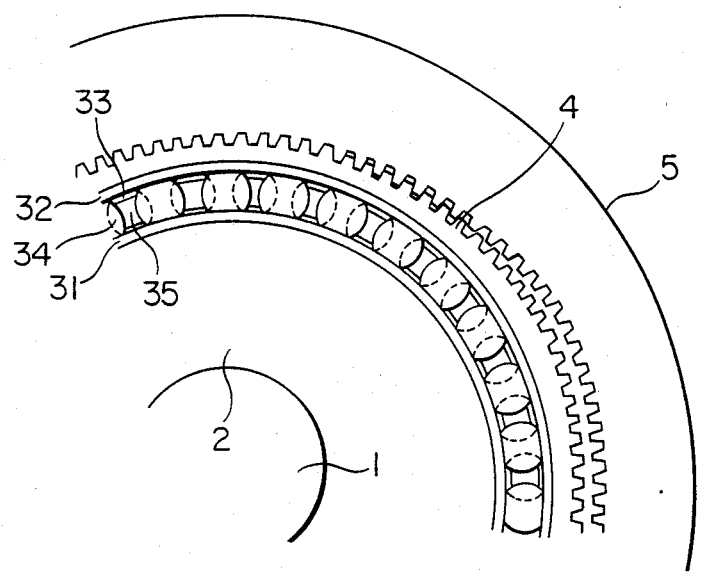
FIG. 5 is a partially enlarged front view of the harmonic drive apparatus of FIG. 3.

As shown in FIGS. 1, 2, and 5, a harmonic drive apparatus according to the present invention comprises a preferably elliptical wave generator 2 rotated by its rotary shaft 1, a bearing 30 disposed outside the wave generator 2, a flexspline 4 disposed outside the bearing 30, and a circular spline 5 disposed outside the flexspline 4 and secured to casings 7 and 7' which are rotatable around the rotary shaft 1 and a rotary output shaft 6 through bearings 9 and 8, respectively. The flexspline 4 is preferably elliptical and secured to the output shaft 6 by a fastener such as bolts 61. The flexspline 4 has a number of external teeth 4a around the outer circumference thereof and the circular spline 5 also has a number of internal teeth 5a around the inner circumference thereof to locally engage with the flexspline external teeth 4a. The number of internal teeth 5a of the circular spline 5 is greater than the number of flexspline external teeth 4a. The flexspline 4 is rotatable by the rotation of the rotary shaft 1 through the bearing 30.

Figure 3:
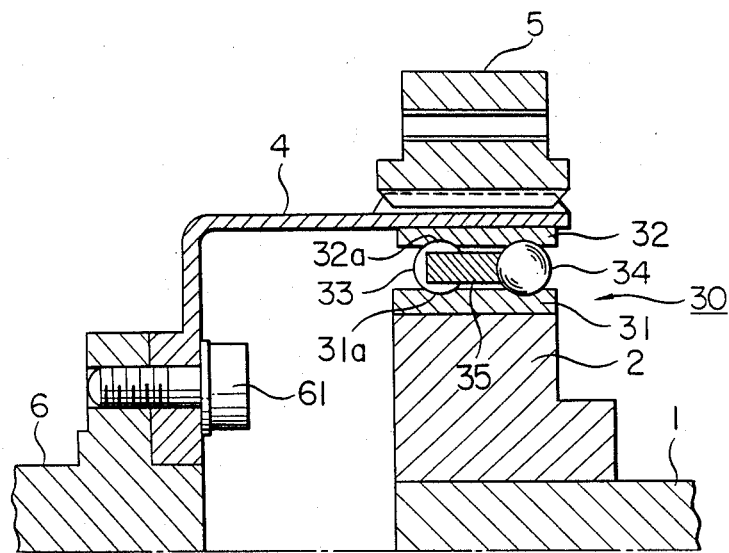
FIG. 3 is a partially enlarged sectional side view of the harmonic drive apparatus of FIG. 2.

As shown in FIGS. 2 and 3, the bearing 30, which is preferably elliptical, comprises inner and outer rings 31 and 32, respectively, a number of balls disposed between the inner and outer rings, and a ball retainer 35 for retaining the balls in cooperation with the inner and outer rings. The inner ring 31 fitted onto the wave generator 2 has a plurality of grooved races such as two grooved races 31a for receiving the balls 33 and 34 arranged in two lines along the outer circumference of the inner ring 31, and the outer ring 32 correspondingly has two grooved races 32a for receiving the balls 33 and 34 formed along the inner circumference of the outer ring 32. Accordingly, the balls 33 and 34 positioned between the inner ring 31 and the outer ring 32 are arranged in two circumferential lines, and are spaced along the circumferential direction of the bearing 30 by the ball retainer 35.

Figure 4:
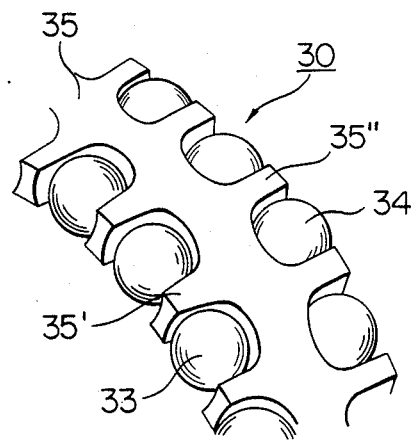
FIG. 4 is a partially enlarged perspective view of a bearing in the harmonic drive apparatus of FIG. 3.

As shown in FIG. 4, the ball retainer 35 of the bearing 30 which is disposed between the inner and outer rings 31 and 32 has lateral projections 35' and 35" pointing in the widthwise direction of the bearing 30 which separately retain the respective balls 33 and 34 along the circumferential direction of the bearing 30 in cooperation with the inner and outer rings 31 and 32. Each of the lateral projections 35" is disposed midway between adjacent lateral projections 35' along the circumference of the bearing 30. Concave portions in the ball retainer 35 for receiving the balls 33 and 34 are formed by the lateral projections 35' and 35", respectively, so that the balls in each line are retained midway between the balls in the other line.

In the above construction of the bearing according to the present invention, two groups of balls 33 and 34 in the bearing 30 are reliably alternatively arranged along the circumferential direction of the bearing 30. Accordingly, in comparison with the conventional bearing, the number of balls located in the vicinity of the tooth engaging positions is doubled and the distance between the balls of the bearing 30 around the circumferential direction of the bearing 30 is halved, so that the frequency of the torque fluctuation is doubled and the vibrative force caused by the torque fluctuation is reduced by more than 50% when the bearing is rotated at the same rotational speed as the conventional one. Thus, the vibration of the apparatus at the low rotational speed thereof can be greatly reduced. Since the frequency of the vibrative force is twice that in the conventional apparatus, this frequency becomes distant from the natural frequency of vibration of mechanical systems caused by e.g., robots for industry, greatly reducing the abnormal situations caused by the resonances or similar states induced when the vibrational frequency is close to the natural frequencies. It has a great practical effect that such abnormal situations are greatly reduced. Furthermore, the number of balls located in the vicinity of the tooth engaging positions is twice that in the conventional apparatus, the stresses on the flexspline and the circular spline in the tooth engaging positions can be reduced by half and dispersed so that the endurance of the flexspline is greatly improved, lengthening the life of the apparatus.

Figure 6:
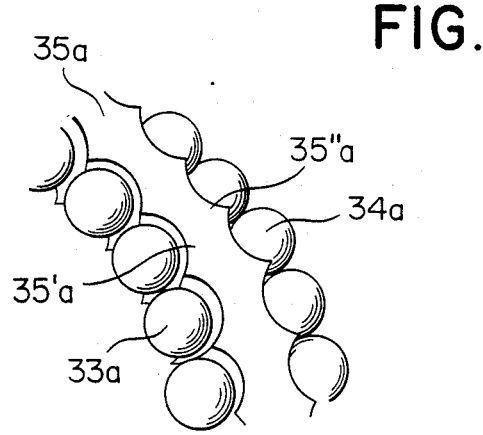
FIG. 6 is a partially enlarged perspective view of another embodiment of the bearing according to the present invention.

FIG. 6 shows another embodiment of the ball retainer 35a in which the balls are disposed so as to be closer to each other along the circumferential direction, and the lengths of the projections 35'a and 35"a laterally projecting from the ring portion of the ball retainer 35a are shorter than in the ball retainer shown in FIG. 4. In this ball retainer 35a, the balls 33a on one side of the retainer are equally spaced along a circumferential line, and are located between (offset from) the balls 34a in a circumferential line on the other side of the retainer 35a.

Although the embodiments described above employ two circumferential lines of also balls, the inclusion of two circumferential lines of balls does not mean that additional circumferential lines of balls cannot be provided and it is therefore possible to arrange the balls in three or more circumferential lines with the balls in each line being equally spaced along the circumference of the bearing and with the balls each circumferential line being disposed between the balls in the other circumferential lines.

As mentioned above, according to the present invention, a ball retainer has a number of balls equally spaced along the circumferential direction and disposed in a plurality of circumferential lines separated from one another along the axial direction of the wave generator, and the balls in each circumferential line are retained between the balls in the other circumferential lines. Therefore, there are obtained practical effects that the problems caused by the torque fluctuation during low speed operation of the harmonic drive apparatus can be greatly reduced and the stresses on the flexspline and the circular spline at the tooth engaging positions are greatly reduced and dispersed, thereby lengthening the life of the apparatus.

It is to be understood that the present effects cannot be obtained simply by using two ball bearings each having balls in a single circumferential line, or by simply using a ball bearing with balls in a plurality of circumferential lines, since the balls in each circumferential line cannot be maintained between those in the other circumferential lines at all times and accordingly the frequency of the torque fluctuation does not become twice that in a ball bearing with balls in a single circumferential line.

What is claimed is:

1. A harmonic drive apparatus comprising:
   a circular spline which has internal spline teeth and which is rotatable around a rotational axis;
   a flexible cylindrical flexspline which is concentrically disposed within the circular spline and which has external spline teeth, the number of flexspline external teeth being less than the number of internal teeth of the circular spline;
   a wave generator disposed within the flexspline for flexing the flexspline in the radial direction thereof so as to locally engage the flexspline external teeth with the internal teeth of the circular spline; and
   a multi-row ball bearing flexible in the radial direction thereof disposed between the wave generator and the flexspline, said bearing including balls equally spaced along the circumferential direction of the wave generator in at least two circumferential lines surrounding said wave generator inside said flexspline, the circumferential lines being separated from one another in the axial direction of the wave generator, and means for increasing the frequency of torque fluctuation of the apparatus when said generator is rotated, said means including means, flexible in the radial direction of said bearing, for retaining the balls in each of the circumferential lines offset from the balls in at least one other of the circumferential lines with respect to the circumferential direction of the wave generator.

2. A harmonic drive apparatus as claimed in claim 1, wherein said bearing comprises radially flexible inner and outer rings each having at least two grooved races for receiving the same number of balls on outer and inner circumferential surfaces of the rings, respectively, and a ball retainer disposed between the inner and outer rings and having lateral projections for separately circumferentially retaining the balls in each of two of the circumferential lines in cooperation with the rings so as to position the balls in each of the two circumferential lines offset from the balls in the other of the two circumferential lines with respect to the circumferential direction of the wave generator.

3. A harmonic drive apparatus as claimed in claim 1, wherein two of the circumferential lines of balls are retained circumferentially offset from each other so that the balls of one of the two circumferential lines are disposed midway between the balls of the other of the two circumferential lines with respect to the circumferential direction of the wave generator.

* * * * *